US012727621B2

(12) United States Patent
Akao et al.

(10) Patent No.: US 12,727,621 B2
(45) **Date of Patent: *Sep. 8, 2026**

(54) FLAVOR GENERATION DEVICE, METHOD OF CONTROLLING FLAVOR GENERATION DEVICE, AND PROGRAM

(71) Applicant: JAPAN TOBACCO INC., Tokyo (JP)

(72) Inventors: Takeshi Akao, Tokyo (JP); Hajime Fujita, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 227 days.

This patent is subject to a terminal disclaimer.

(21) Appl. No.: 18/777,592

(22) Filed: Jul. 19, 2024

(65) Prior Publication Data

US 2024/0365875 A1 Nov. 7, 2024

Related U.S. Application Data

(63) Continuation of application No. 17/103,974, filed on Nov. 25, 2020, now Pat. No. 12,063,974, which is a (Continued)

(51) Int. Cl.
*A24F 40/51* (2020.01)
*A24F 40/40* (2020.01)

(Continued)

(52) U.S. Cl.
CPC .............. *A24F 40/51* (2020.01); *A24F 40/40* (2020.01); *A24F 40/53* (2020.01); *A24F 40/57* (2020.01);

(Continued)

(58) Field of Classification Search
None
See application file for complete search history.

(56) References Cited

U.S. PATENT DOCUMENTS 10,333,330 B2 6/2019 Holzherr
12,063,974 B2 * 8/2024 Akao ...................... A24F 40/51

(Continued)

FOREIGN PATENT DOCUMENTS

CN 204157655 U 2/2015
DE 202014101125 U1 3/2014

(Continued)

OTHER PUBLICATIONS

International Search Report and Written Opinion mailed on Aug. 7, 2018, received for PCT Application No. PCT/JP2018/021045 filed on May 31, 2018, 11 Pages.

(Continued)

*Primary Examiner* — Tho D Ta
(74) *Attorney, Agent, or Firm* — XSENSUS LLP

(57) ABSTRACT

A flavor generation device comprising: a case; a first electronic component disposed in the case; a temperature sensor disposed in or in the vicinity of the first electronic component; a second electronic component disposed in the case; and a control device. The second electronic component is disposed away from the temperature sensor at a distance greater than a distance between the temperature sensor and the first electronic component. The control device is configured to detect or estimate the temperature of the second electronic component on the basis of an output value from the temperature sensor.

15 Claims, 9 Drawing Sheets

Related U.S. Application Data continuation of application No. PCT/JP2018/021045, filed on May 31, 2018.

(51) Int. Cl.

| | |
|---|---|
| ***A24F 40/53*** | (2020.01) |
| ***A24F 40/57*** | (2020.01) |
| ***H01M 10/0525*** | (2010.01) |
| ***H01M 10/42*** | (2006.01) |
| ***H01M 10/48*** | (2006.01) |
| *A24F 40/10* | (2020.01) |
| *A24F 40/20* | (2020.01) |
| *A24F 40/30* | (2020.01) |

(52) U.S. Cl.

CPC ... *H01M 10/0525* (2013.01); *H01M 10/4257* (2013.01); *H01M 10/486* (2013.01); *A24F 40/10* (2020.01); *A24F 40/20* (2020.01); *A24F 40/30* (2020.01); *H01M 2010/4271* (2013.01); *H01M 2220/30* (2013.01)

(56) References Cited

U.S. PATENT DOCUMENTS

| | | | |
|---|---|---|---|
| 2011/0271968 | A1 | 11/2011 | Carpenter et al. |
| 2015/0142387 | A1 | 5/2015 | Alarcon et al. |
| 2015/0237917 | A1 | 8/2015 | Lord |
| 2017/0119052 | A1 | 5/2017 | Williams et al. |
| 2017/0250552 | A1 | 8/2017 | Liu |
| 2017/0303590 | A1 | 10/2017 | Cameron et al. |
| 2017/0324118 | A1 | 11/2017 | Ishishita |

FOREIGN PATENT DOCUMENTS

| | | | |
|---|---|---|---|
| JP | 2016-105672 | A | 6/2016 |
| JP | 2016-188812 | A | 11/2016 |
| JP | 2017-010893 | A | 1/2017 |
| JP | 2017-79747 | A | 5/2017 |
| JP | 2017-518733 | A | 7/2017 |
| WO | 2013/060781 | A1 | 5/2013 |

OTHER PUBLICATIONS

Office Action issued on Nov. 13, 2020, in corresponding Japanese patent Application No. 2020-522524, 9 pages.

Extended European search report issued on May 26, 2021, in corresponding European patent Application No. 18921133.7, 10 pages.

Russian Office Action issued Jun. 29, 2021, in corresponding Russian Application No. 2020143272.

* cited by examiner

141
E1
120
121
100
111
A
110
10
113
50
114
E2

130
132
131
123
133
122A
121P
A
121R
121Q
122A
125
125
121

121R
120
121t
121t
111t
111t
140
50
110
180
150
100
10

FLAVOR GENERATION DEVICE, METHOD OF CONTROLLING FLAVOR GENERATION DEVICE, AND PROGRAM

CROSS-REFERENCE TO RELATED APPLICATIONS

The present application is a continuation of U.S. application Ser. No. 17/103,974, filed Nov. 25, 2020, which is a bypass continuation of PCT filing PCT/JP2018/021045, filed May 31, 2018, the entire contents of each are incorporated herein by reference.

TECHNICAL FIELD

The present invention relates to a flavor generation device, a method of controlling a flavor generation device, and a program.

BACKGROUND ART

As alternatives to cigarettes, aerosol generation devices and flavor generation devices that atomize an aerosol source by using a load such as a heater to taste a flavor of aerosol are known (PTL 1 and PTL 2). Such an aerosol generation device or flavor generation device includes: a heating element that atomizes an aerosol source; a power supply that supplies the heating element with power; and a controller that controls a load and the power supply.

The aerosol generation device or the flavor generation device described in PTL 1 or 2 includes a temperature sensor configured to measure the ambient temperature for the device in use. PTL 1 discloses: adjusting the heating temperature of the heating element on the basis of an ambient temperature reading obtained from the temperature sensor; and disabling the device when the ambient temperature measured by the temperature sensor is above a critical threshold value. PTL 2 discloses preventing a charging device from charging the power supply when the ambient temperature reading obtained by the temperature sensor is above a predetermined temperature.

CITATION LIST

Patent Literature

PTL 1: Japanese Unexamined Patent Application Publication No. 2017-079747

PTL 2: Japanese Unexamined Patent Application Publication (Translation of PCT Application) No. 2017-518733

SUMMARY OF INVENTION

A first feature is summarized as follows. A flavor generation device includes: a case; a first electronic component disposed in the case; a temperature sensor disposed in or adjacent to the first electronic component; and a second electronic component disposed in the case and away from the temperature sensor, the distance between the temperature sensor and the second electronic component being greater than the distance between the temperature sensor and the first electronic component; and a controller configured to determine or estimate the temperature of the second electronic component on the basis of an output value obtained from the temperature sensor.

A second feature is summarized as follows. In the flavor generation device having the first feature, the first electronic component includes the controller.

A third feature is summarized as follows. In the flavor generation device having the second feature, the controller is configured to perform a first control on the first electronic component when the output value obtained from the temperature sensor satisfies a first condition, and the controller is configured to perform a second control on the second electronic component when the output value obtained from the temperature sensor satisfies a second condition different from the first condition.

A fourth feature is summarized as follows. In the flavor generation device having the second or third feature, the controller is configured to perform a predetermined control on the second electronic component without performing a control on the first electronic component when the output value obtained from the temperature sensor satisfies a predetermined condition.

A fifth feature is summarized as follows. In the flavor generation device having the first feature, the first electronic component includes a pressure sensor.

A sixth feature is summarized as follows. In the flavor generation device having the fifth feature, the controller or the pressure sensor is configured to calibrate, on the basis of the output value obtained from the temperature sensor, an output value obtained from the pressure sensor.

A seventh feature is summarized as follows. The flavor generation device having the fifth or sixth feature has an inhalation opening through which a flavor is inhaled, and the pressure sensor is configured to output a value representing pressure change that occurs when a user inhales or exhales through the inhalation opening.

An eighth feature is summarized as follows. In the flavor generation device having any one of the first to seventh features, the second electronic component is a power supply.

A ninth feature is summarized as follows. In the flavor generation device having the eighth feature, the power supply includes at least an electrolyte solution or an ionic liquid, and the controller is configured to perform a protection control to protect the power supply when the output value obtained from the temperature sensor is lower than or equal to a first predetermined temperature at which the electrolyte solution or the ionic liquid freezes or when the temperature of the power supply is estimated, on the basis of the output value obtained from the temperature sensor, to be lower than or equal to the first predetermined temperature.

A tenth feature is summarized as follows. In the flavor generation device having the eighth or ninth feature, the power supply is a lithium-ion secondary battery, and the controller is configured to perform a protection control to protect the power supply when the output value obtained from the temperature sensor is lower than or equal to a second predetermined temperature at which electrodeposition occurs on an electrode of the power supply or when the temperature of the power supply is estimated, on the basis of the output value obtained from the temperature sensor, to be lower than or equal to the second predetermined temperature.

An eleventh feature is summarized as follows. In the flavor generation device having any one of the eighth to tenth features, the controller is configured to perform a protection control to protect the power supply when the output value obtained from the temperature sensor is higher than or equal to a third predetermined temperature at which a structural or compositional change occurs in an electrode of the power supply or when the temperature of the power supply is estimated, on the basis of the output value obtained from the temperature sensor, to be higher than or equal to the third predetermined temperature.

A twelfth feature is summarized as follows. In the flavor generation device having any one of the eighth to eleventh features, the controller is configured to perform a protection control to protect the power supply when the output value obtained from the temperature sensor is less than 0° C. or greater than or equal to 60° C. or when the temperature of the power supply is estimated, on the basis of the output value obtained from the temperature sensor, to be lower than 0° C. or higher than or equal to 60° C.

A thirteenth aspect is summarized as follows. In the flavor generation device having any one of the ninth to twelfth features, the protection control includes: restricting charging and/or discharging of the power supply; and/or transmitting an alert signal.

A fourteenth feature is summarized as follows. The flavor generation device having any one of the first to thirteenth features includes a load that heats or atomizes an aerosol source or a flavor source by using power supplied by the power supply, and the controller is configured to control supply of power to the load.

A fifteenth feature is summarized as follows. In the flavor generation device having any one of the first to fourteenth features, at least part of the outer shape of the first electronic component is cylindrical.

A sixteenth feature is summarized as follows. The flavor generation device having any one of the first to fifteenth features includes a heat transfer suppression unit in which the first electronic component and the temperature sensor are at least partially wrapped, and the heat transfer suppression unit is configured to suppress transfer of heat between the first electronic component and the case.

A seventeenth feature is summarized as follows. In the flavor generation device having the sixteenth feature, the heat transfer suppression unit forms a space in which the first electronic component and the temperature sensor are housed.

An eighteenth feature is summarized as follows. The flavor generation device having any one of the first to seventeenth features includes a thermally conductive member disposed between the first and second electronic components or adjacent to the first or second electronic component.

A nineteenth feature is summarized as follows. The flavor generation device having any one of the first to fifteenth features includes: a first member in which the first electronic component and the temperature sensor are at least partially wrapped; and a second member disposed between the first and second electronic components. The thermal conductivity of the second member is higher than the thermal conductivity of the first member.

A twentieth feature is summarized as follows. In the flavor generation device having the nineteenth feature, the first electronic component and the temperature sensor are enclosed with the first and second members, and the second member faces the second electronic component.

A twenty-first feature is summarized as follows. A flavor generation device includes: a power supply; a controller; a temperature sensor disposed in or adjacent to the controller. The controller is configured to perform a control to protect the power supply when an output value obtained from the temperature sensor is within a range in which the controller is in no need of cooling and when the output value satisfies a predetermined condition.

A twenty-second feature is summarized as follows. The flavor generation device having the twenty-first feature includes a thermally conductive member disposed between the power supply, and the controller and the temperature sensor.

A twenty-third feature is summarized as follows. The flavor generation device having the twenty-first feature includes: a cover that accommodates the power supply, the controller, and the temperature sensor; a first member disposed in the cover, the first electronic component and the temperature sensor being at least partially wrapped in the first member; and a second member disposed between the power supply, and the controller and the temperature sensor. The thermal conductivity of the second member is higher than the thermal conductivity of the first member.

A twenty-fourth feature is summarized as follows. A method of controlling a flavor generation device that includes a power supply, a controller, and a temperature sensor disposed in or adjacent to the controller includes performing a control to protect the power supply when an output value obtained from the temperature sensor is within a range in which the controller is in no need of cooling and when the output value satisfies a predetermined condition.

A twenty-fifth feature is summarized as follows. A program causes a flavor generation device to execute the method described as the twenty-fourth feature.

DESCRIPTION OF EMBODIMENTS

The following describes an embodiment. In the accompanying drawings, the same or like reference signs denote the same or like parts. These drawings are schematic, and it should be noted that constituent elements may not be drawn to scale.

Due consideration needs to be given to the following description to determine, for example, specific dimensions. Needless to say, the relative dimensions and the scale ratio may vary from drawing to drawing.

Overview of Disclosure

In some cases, recommended operating temperature ranges are specified for electronic components such as a rechargeable power supply and a controller that controls the power supply. It is preferable to determine, by using a temperature sensor, the temperature of such an electronic component itself rather than the ambient temperature representing the temperature in the environment in which the electronic component is used. Flavor generation devices that generate flavored aerosol or vapor, and portable flavor generation devices in particular, most notably electronic cigarettes and heat-not-burn tobacco, are preferably light, small, and less costly as far as possible in terms of user-friendliness of the devices. Nevertheless, installation of a temperature sensor on such a flavor generation device required to have these features has not been studied enough.

A flavor generation device according to an aspect includes: a case; a first electronic component disposed in the case; a temperature sensor disposed in or adjacent to the first electronic component; a second electronic component disposed in the case and away from the temperature sensor, the distance between the temperature sensor and the second electronic component being greater than the distance between the temperature sensor and the first electronic component; and a controller configured to determine or estimate the temperature of the second electronic component on the basis of an output value obtained from the temperature sensor.

A feature of the flavor generation device according to the aspect above is that the temperature of the second electronic component is determined or estimated by using the temperature sensor disposed in or adjacent to the first electronic component. The temperature of the second electronic component may be determined without the need for a dedicated temperature sensor disposed in or adjacent to the second electronic component, and this feature may thus be a workaround to the problems such as increases in weight, size, and cost of the flavor generation device.

Embodiments

Flavor Generation Device

Figure 1:
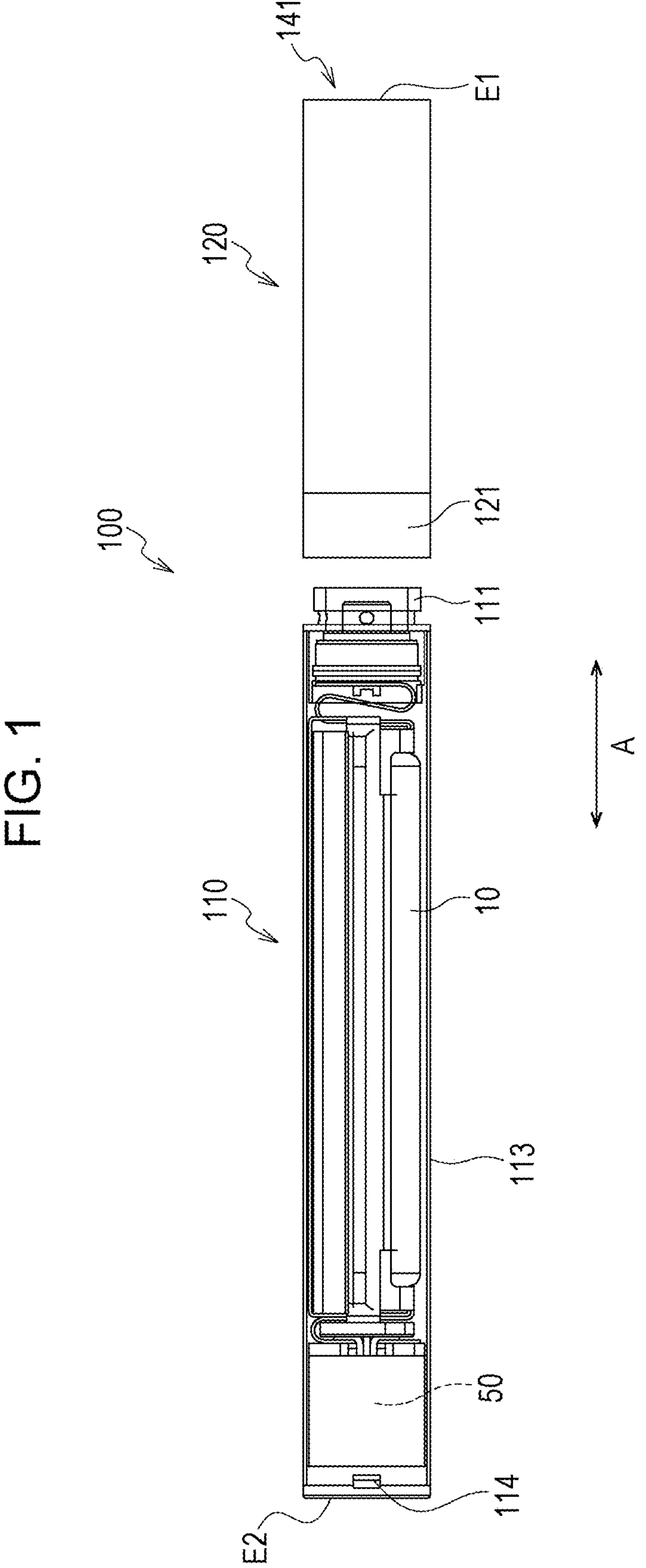
FIG. 1 is an exploded view of a flavor generation device according to an embodiment.
Figure 2:
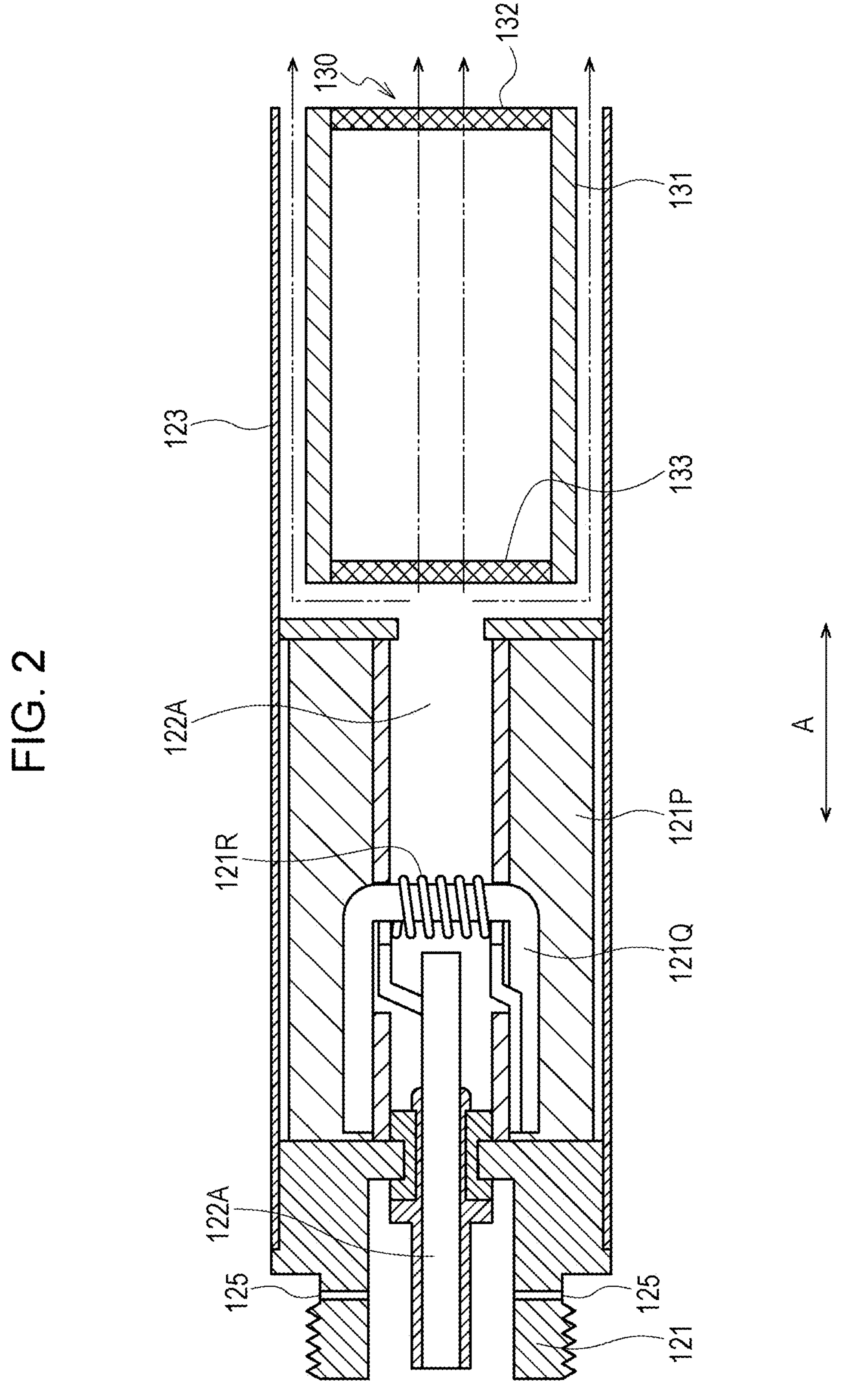
FIG. 2 illustrates an atomization unit according to the embodiment.
Figure 3:
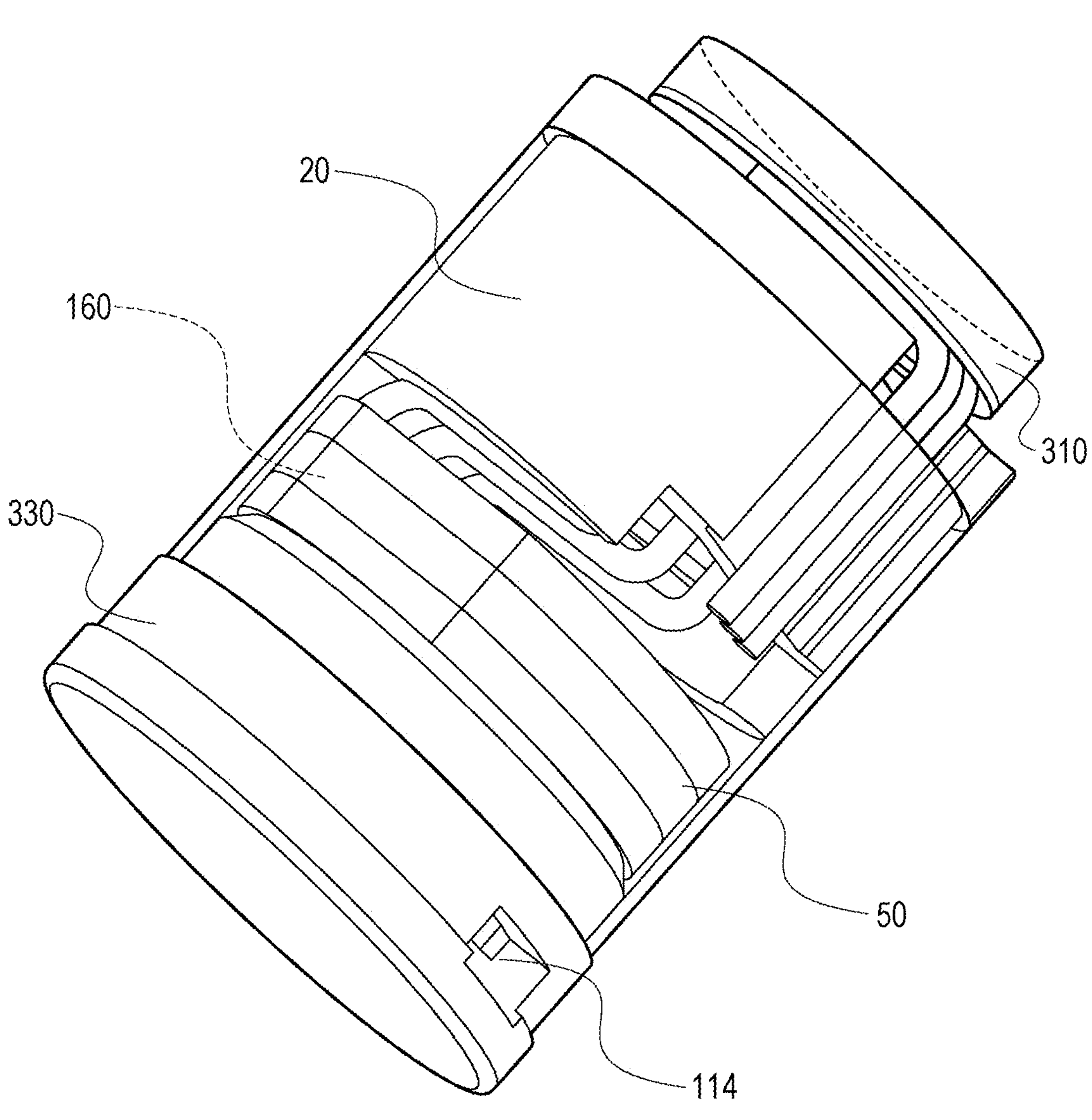
FIG. 3 is an enlarged perspective view of part of a power supply unit.
Figure 4:
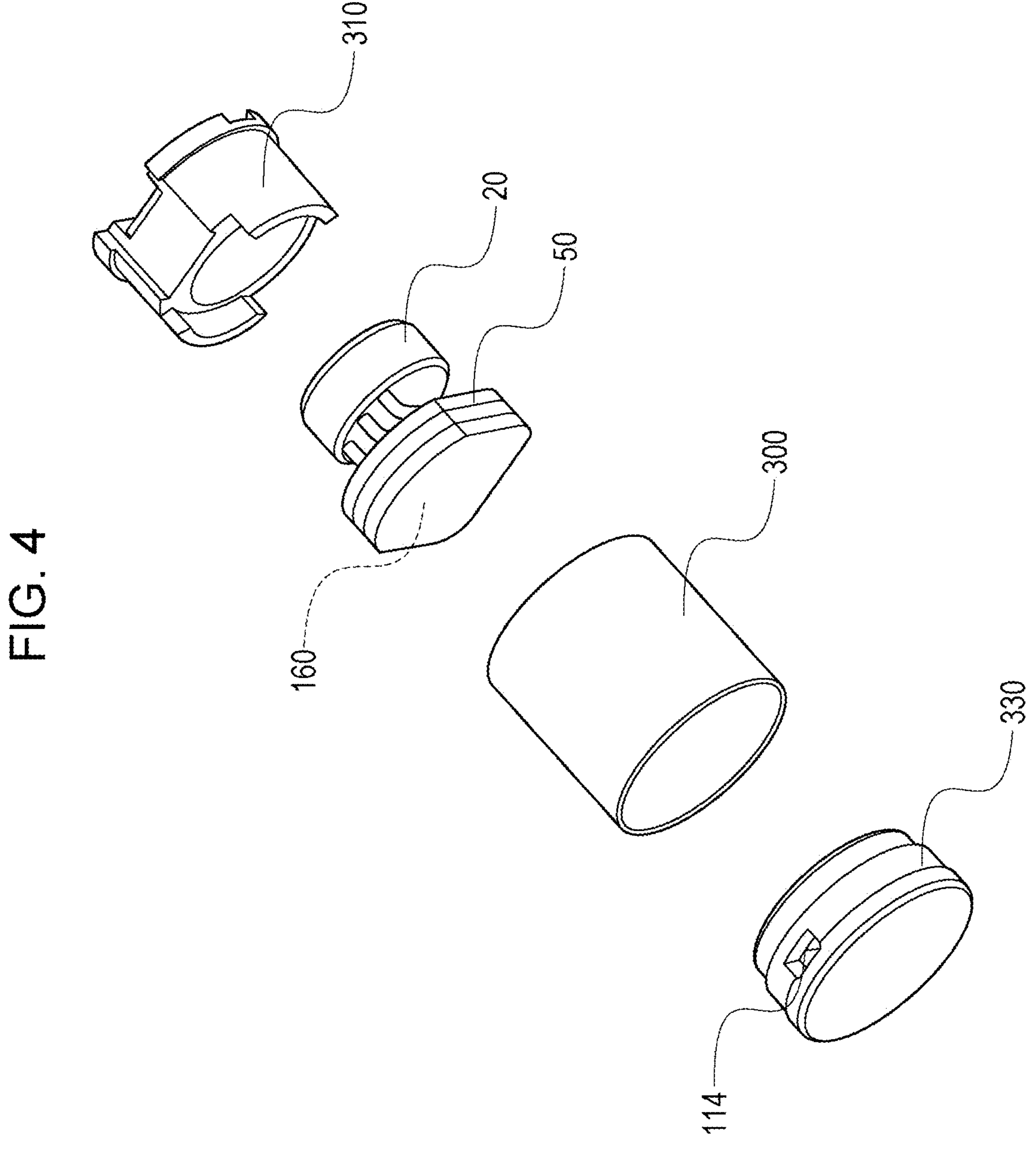
FIG. 4 is an exploded perspective view of part of the power supply unit exploded.
Figure 5:
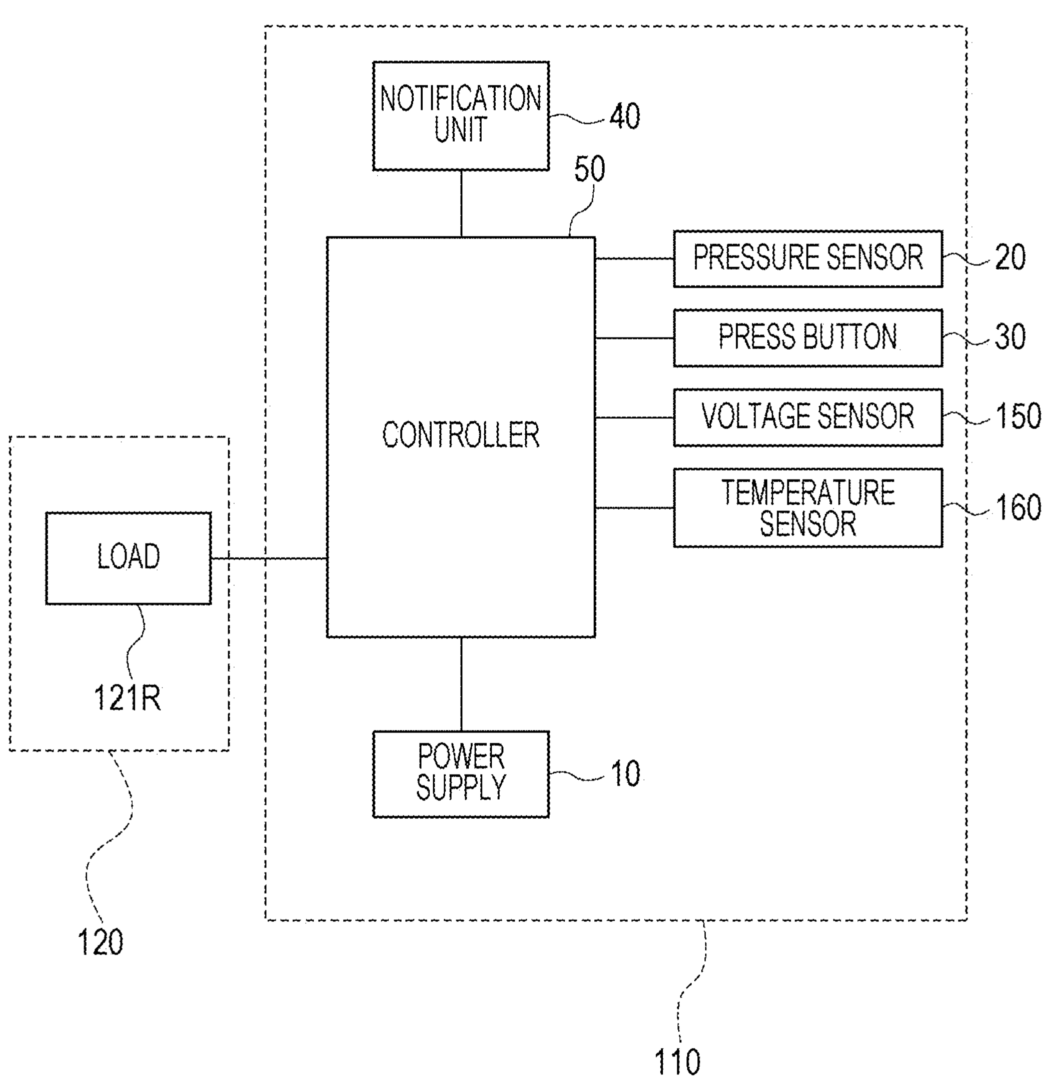
FIG. 5 is a block diagram of the flavor generation device.
Figure 6:
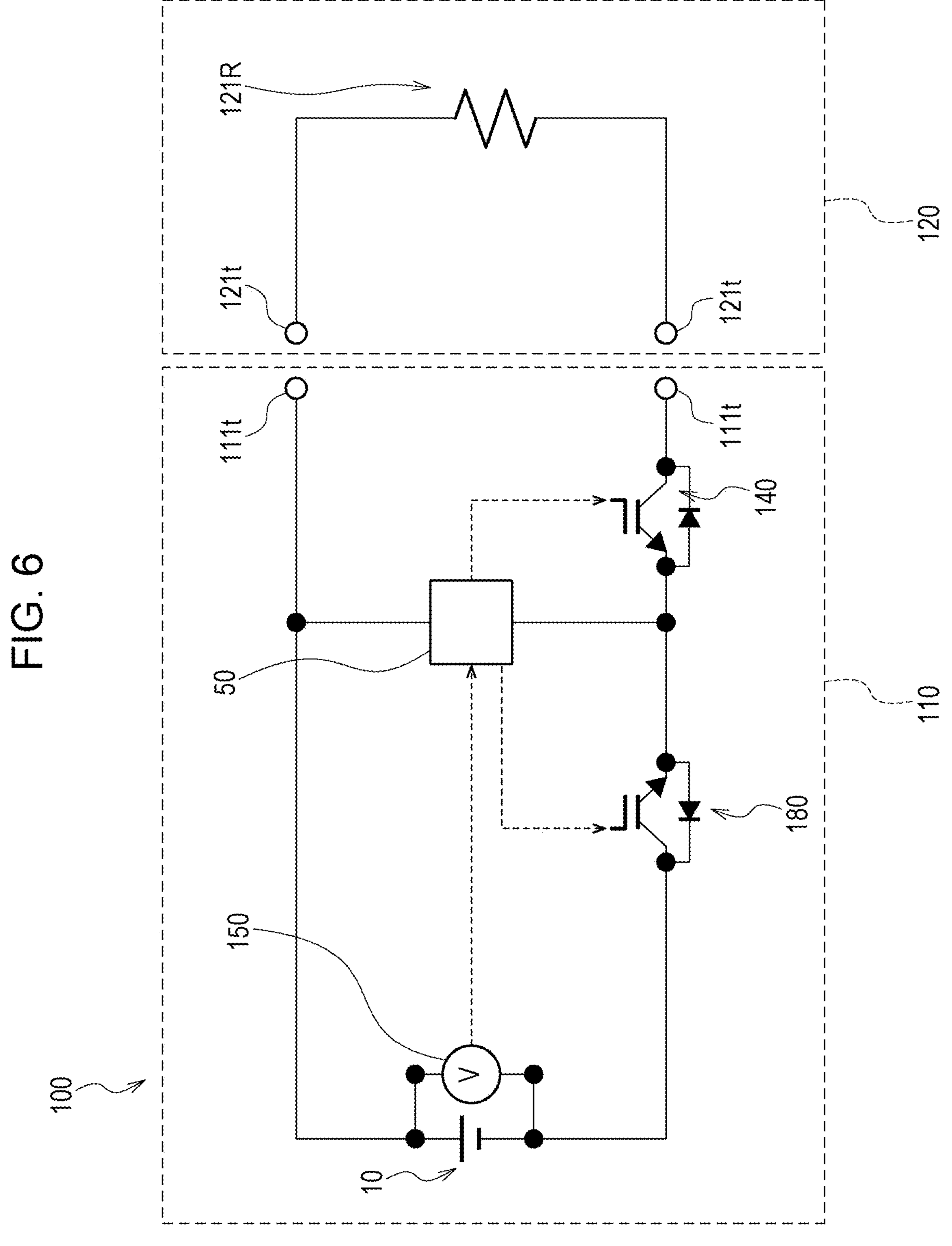
FIG. 6 is a diagram of an electric circuit constructed of the atomization unit and a battery unit, illustrating the state in which a load is connected.
Figure 7:
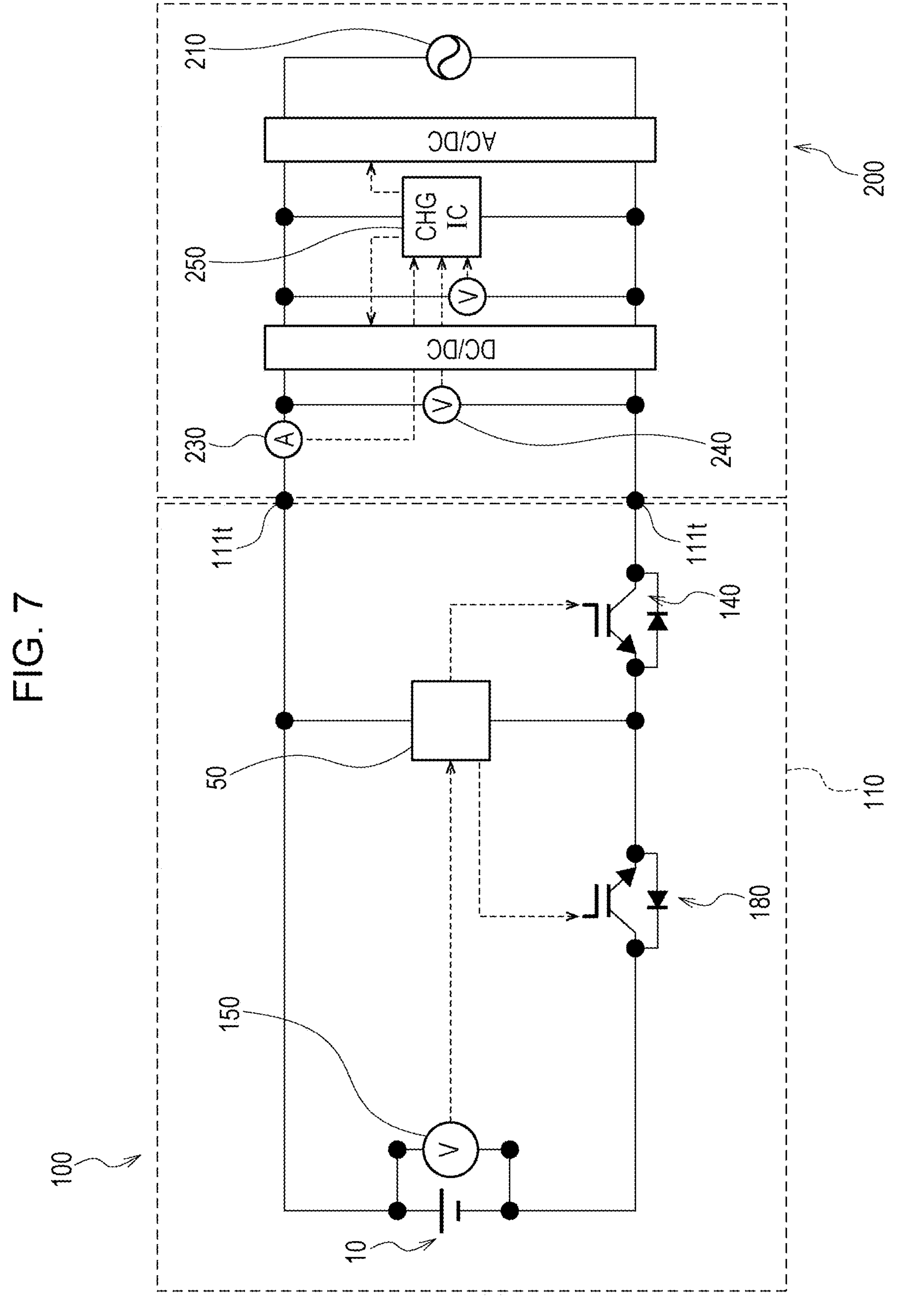
FIG. 7 is a diagram of an electric circuit constructed of a charger and the battery unit, illustrating the state in which the charger is connected.

The following describes a flavor generation device according to an embodiment. FIG. 1 is an exploded view of the flavor generation device according to the embodiment. FIG. 2 illustrates an atomization unit according to the embodiment. FIG. 3 is an enlarged perspective view of part of a power supply unit. FIG. 4 is an exploded perspective view of part of the power supply unit. FIG. 5 is a block diagram of the flavor generation device. FIG. 6 is a diagram of an electric circuit constructed of the atomization unit and a battery unit, illustrating the state in which a load is connected. FIG. 7 is a diagram of an electric circuit constructed of a charger and the battery unit, illustrating the state in which the charger is connected.

A flavor generation device 100 may be a non-combustion type flavor inhaler that enables inhalation of a flavor without involving combustion. The flavor generation device 100 may be shaped in a manner so as to extend in a predetermined direction A, which is a direction from a non-inhalation end E2 to an inhalation end E1. In this case, the flavor generation device 100 may have: one end portion E1 including an inhalation opening 141, through which the flavor is inhaled; and the other end portion E2 opposite to the inhalation opening 141.

The flavor generation device 100 may include a power supply unit 110 and an atomization unit 120. The atomization unit 120 may include a case 123 and a load 121R disposed in the case 123. The case 123 may be part of the outermost surface of the flavor generation device.

The atomization unit 120 may be removably attached to the power supply unit 110 via mechanical connection portions 111 and 121. With the atomization unit 120 and the power supply unit 110 being mechanically connected to each other, the load 121R, which is accommodated in the atomization unit 120 and will be described later, is electrically connected via electrical connection terminals 111*t* and electrical connection terminals 121*t* to a power supply 10, which is disposed in the power supply unit 110. That is, the electrical connection terminals 111*t* and 121*t* constitute a connection portion that can form an electrical connection between the load 121R and the power supply 10.

The atomization unit 120 includes: an aerosol source that is to be inhaled by the user; and the electrical load 121R, which atomizes the aerosol source by using power supplied by the power supply 10.

The load 121R may be any element capable of generating aerosol from the aerosol source by using power supplied by the power supply. For example, the load 121R may be a heating element such as a heater or may be an element such as an ultrasonic generator. Examples of the heating element include a heating resistor, a ceramic heater, and an induction heater.

A more specific example of the atomization unit 120 will be described below with reference to FIGS. 1 and 2. The atomization unit 120 may include a reservoir 121P, a wick 121Q, and the load 121R. The reservoir 121P may be configured to store a liquid aerosol source. The reservoir 121P may be a porous body made of a material such as a resin web. The wick 1210 may be a liquid retention member that absorbs the aerosol source from the reservoir 121P through capillary action. The wick 1210 may be made of, for example, glass fiber or porous ceramics.

The load 121R heats the aerosol source retained by the wick 121Q. The load 121R is, for example, a resistive heating element (e.g., a heating wire) wound around the wick 121Q.

Outside air is taken into a flow path 122A through an inlet 125, and the air in the flow path 122A then passes by near the load 121R disposed in the atomization unit 120. Together with the air, aerosol generated by the load 121R flows to the inhalation opening 141. The flow path 122A hereinafter refers to a path that is provided between the inlet 125 and the inhalation opening 141 in such a manner that fluid can flow therethrough. That is, the flow path 122A allows passage of airflow caused by the user's inhalation. The flow path 122A in the present embodiment extends from a portion forming a connection between the atomization unit 120 and the power supply unit 110, lies through the atomization unit 120, and leads to the inhalation opening 141.

An embodiment in which the inlet 125 is provided in the connection portion 121 of the atomization unit 120 has been described above. In an alternative embodiment, the inlet 125 may be provided in the connection portion 111 of the power supply unit 110. In a still alternative embodiment, the inlet 125 may be provided in the connection portion 121 of the atomization unit 120 and in the connection portion 111 of the power supply unit 110. In any embodiment, the inlet 125 is provided in a portion forming a connection between the atomization unit 120 and the power supply unit 110.

The aerosol source may be a substance that is in a liquid state at normal temperature. For example, polyhydric alcohol may be used as the aerosol source. A tobacco raw material or an extract from such a tobacco raw material may be included in the aerosol source to release a flavoring by the application of heat.

The embodiment above has described, in detail, an example of the aerosol source that is in a liquid state at normal temperature. Alternatively, a substance that is in a solid state at normal temperature may be used as the aerosol source. In this case, the load 121R may be in contact with or close to a solid-state aerosol source to generate aerosol from the solid-state aerosol source.

The atomization unit 120 may include a flavor unit (cartridge) 130, which is replaceable. The flavor unit 130 may include a tubular body 131, in which a flavor source is contained. The tubular body 131 may include a membrane member 133 and a filter 132, which allow passage of, for example, air and aerosol. The flavor source may be placed in a space defined by the membrane member 133 and the filter 132.

In a preferred embodiment, the flavor source in the flavor unit 130 gives a flavoring to aerosol generated by the load 121R in the atomization unit 120. A flavor imparted to aerosol by the flavor source is transmitted to the inhalation opening 141 of the flavor generation device 100.

The flavor source in the flavor unit 130 may be a substance that is in a solid state at normal temperature. The flavor source is, for example, a raw material piece that is obtained from a plant-derived material to give a flavoring to aerosol. A tobacco material such as shredded tobacco or a tobacco raw material may be formed into grains and used as the raw material piece serving as the flavor source. Alternatively, the flavor source may be a tobacco material formed into a sheet. The raw material piece serving as the flavor source may be a plant other than tobacco (e.g., mint or an herb). A flavoring substance such as menthol may be put in the flavor source.

The flavor generation device 100 may include a mouthpiece having an inhalation opening through which the user can inhale a substance to be inhaled. The mouthpiece may be detachably attached to the atomization unit 120 or the flavor unit 130 or may be integral to and inseparable from the atomization unit 120 or the flavor unit 130.

A more specific example of the power supply unit 110 will be described below with reference to FIGS. 1, 3, and 4. The power supply unit 110 may include: a case 113; a first electronic component disposed in the case 113; and a second electronic component disposed in the case 113. The case 113 may be part of the outermost surface of the flavor generation device.

The power supply unit 110 may include the power supply 10, a pressure sensor 20, a notification unit 40, a controller 50, and a temperature sensor 160. In this case, the first electronic component mentioned above may be, for example, the controller 50 or the pressure sensor 20. The second electronic component may be, for example, the power supply 10.

The power supply 10 stores power needed for the operation of the flavor generation device 100. The power supply 10 may be detachable from the power supply unit 110. The power supply 10 may be a rechargeable battery such as a lithium-ion secondary battery.

The secondary battery may include: a positive electrode; a negative electrode; a separator that keeps the positive electrode and the negative electrode apart from each other; and an electrolyte solution or an ionic liquid. The electrolyte solution or the ionic liquid may be, for example, a solution containing an electrolyte. The positive electrode is made of, for example, a positive electrode material such as lithium oxide, and the negative electrode is made of, for example, a negative electrode material such as graphite. The electrolyte solution may be, for example, an organic solvent containing a lithium salt.

The pressure sensor 20 is configured to output a value representing pressure change that occurs in the flavor generation device 10 when the user inhales or exhales through the inhalation opening 141. Specifically, the pressure sensor 20 may be a sensor that outputs an output value (e.g., a voltage value or a current value) corresponding to the atmospheric pressure varying in accordance with the flow rate of air being sucked in from the non-inhalation side toward the inhalation side (i.e., the user's puff action). The output value obtained from the pressure sensor may include the dimension of pressure or may include, in place of the dimension of pressure, the flow rate or the flow velocity of air being sucked in. Examples of such a pressure sensor include condenser microphone sensors and well-known flow rate sensors.

The notification unit 40 makes notification to provide various pieces of information to the user. The notification unit 40 may be, for example, a light-emitting element such as an LED. Alternatively, the notification unit 40 may be an acoustic element that generates sounds or a vibrator that generates vibrations. Still alternatively, the notification unit 40 may be any combination of light-emitting elements, acoustic elements, and vibrators.

The notification unit 40 may be disposed in any place within the flavor generation device 100. In the present embodiment, the notification unit 40 is provided to the controller 50. When the notification unit 40 is a light-emitting element, a light-transmissive cap may be included as a cap 330. In this case, light emitted by the notification unit 40 is transmitted through the cap 330 to the outside. In some embodiments, the notification unit 40 may be disposed in any place from which the user can perceive notification made by the notification unit 40.

The controller 50 performs various types of control on the flavor generation device 10. For example, the controller 50 may control the supply of power to the load 121R. The flavor generation device 100 may include a switch 140 (see FIG. 6), through which the load 121R may be electrically connected to the power supply 10 or may be electrically disconnected from the power supply 10. The controller 50 causes the switch 140 to open or close. The switch 140 may be, for example, MOSFET.

When the switch 140 is turned ON, power is supplied from the power supply 10 to the load 121R. When the switch 140 is turned OFF, the supply of power from the power supply 10 to the load 121R is stopped. The controller 50 controls on-off of the switch 140.

The power supply unit 110 may include a request sensor capable of outputting an operation request signal for requesting the operation of the load 121R. The request sensor may be a press button designed to be pressed by the user or may be the pressure sensor 20 mentioned above. When receiving an operation request signal for requesting the operation of the load 121R, the controller 50 generates an instruction to put the load 121R into operation. Specifically, the controller 50 may output, to the switch 140, an instruction to put the load 121R into operation. The switch 140 is turned ON in accordance with the instruction. The controller 50 may be configured to control the supply of power from the power supply 10 to the load 121R in the manner stated above. The power supply 10 supplies power to the load 121R, which in turn vaporizes or atomizes the aerosol source.

The power supply unit 110 may include a voltage sensor 150, which can determine or estimate the output voltage of the power supply 10. In this case, the controller 50 can perform a predetermined control in accordance with the output value obtained from the voltage sensor 150. On the basis of an output value obtained from the voltage sensor 150, the controller 50 can determine or estimate the amount of power remaining in the power supply 10 or can detect or presume an abnormality in the power supply 10. When determining that the power supply 10 is running low on power or is under abnormal conditions, the controller 50 may control the notification unit 40, which in turn provides notification to the user.

The power supply unit 110 may be connectable to a charger 200 (see FIG. 7), which charges the power supply 10. In the state in which the charger 200 is connected to the power supply unit 110, the charger 200 is electrically connected to the power supply 10 of the power supply unit 110. A pair of electric terminals 111*t* of the power supply unit 110 is provided to electrically connect the load 121R and may double as a pair of electric terminals for electrically connecting the charger 200. Alternatively, the power supply unit 110 provided with the pair of electric terminals 111*t* may include another pair of electric terminals to electrically connect the charger 200.

The controller 50 may include a judgment unit that judges whether the charger 200 is connected. The judgment unit may, for example, be a means for making a judgment as to the presence or absence of the charger 200 in the connected state on the basis of changes in the potential difference between electric terminals of the pair of electric terminals to which the charger 200 may be connected. The judgment unit is not limited to the means mentioned above and may be any means capable of making a judgment as to the presence or absence of the charger 200 in the connected state.

With the objective of simplifying the structure of the flavor generation device 100, a processor 250, which is included in the charger 200, may be incapable of communicating with the controller 50 of the power supply unit 110. This configuration eliminates communication terminals for establishing communication between the processor 250 of the charger 200 and the controller 50. In other words, the power supply unit 110 may include, at a connection interface between the power supply unit 110 and the charger 200, only two electric terminals that are respectively provided for a main positive line and a main negative line.

The flavor generation device 100 may include, as necessary, a shutdown unit 180, which interrupts or reduces the charging current flowing into the power supply 10. The shutdown unit 180 may be, for example, a MOSFET switch. With the power supply unit 110 being connected to the charger 200, the controller 50 may switch the shutdown unit 180 to the OFF state so that the charging current flowing into the power supply 10 is forcibly interrupted or reduced. Alternatively, without the need for a dedicated unit such as the shutdown unit 180, the controller 50 may turn the switch 140 OFF so that the charging current flowing into the power supply 10 is forcibly interrupted or reduced.

With an alternating-current power supply being provided as an external power supply 210, the charger 200 may include an inverter (AC/DC converter) that converts alternating current into direct current. The charger 200 may include the processor 250, which controls charging of the power supply 10. The charger 200 may also include, as necessary, an ammeter 230 and a voltmeter 240. The ammeter 230 determines the charging current supplied from the charger 200 to the power supply 10. The voltmeter 240 determines the voltage between the pair of electric terminals to which the charger 200 is connected. In other words, the voltmeter 240 determines the output voltage of the power supply 10. The processor 250 of the charger 200 controls charging of the power supply 10 by using an output value obtained from the ammeter 230 and/or an output value obtained from the voltmeter 240. In the case where the power supply 10 is a lithium-ion secondary battery, the processor 250 may control charging of the power supply 10 by the well-known constant-current and constant-voltage (CC-CV) charging method. The charger 200 may also include: a voltage sensor that determines the direct-current voltage output by the inverter; and a converter that may step up and/or step down the direct-current voltage output by the inverter.

The controller 50 may include a judgment means that judges whether the charger 200 is connected to the electric terminals 111*t*. The judgment means may make a judgment as to the presence or absence of the charger 200 in the connected state on the basis of, for example, changes in the potential difference between the pair of electric terminals 111*t* or changes in the potential of at least one of the pair of electric terminals 111*t*.

(Temperature Sensor)

The temperature sensor 160 in the power supply unit 110 is disposed in or adjacent to the first electronic component mentioned above. The temperature sensor 160 can determine the temperature of the first electronic component. The temperature sensor 160 may be accommodated in the case 113.

The first electronic component may be the controller 50. For space saving, the temperature sensor 160 in this case is preferably disposed in the first electronic component, namely, the controller 50. It should be noted that the temperature sensor 160 in the example illustrated in FIG. 4 is disposed in the controller 50. In this case, the controller 50 may be, for example, a microcontroller having the temperature sensor 160 built therein. Instead of being built in the controller 50, the temperature sensor 160 may be disposed on the surface of a casing accommodating the controller 50 or may be adjacent to the controller 50. In the case where the first electronic component is the pressure sensor 20, the temperature sensor 160 may be disposed in or adjacent to the pressure sensor 20.

The power supply 10 (the second electronic component) is disposed away from the temperature sensor 160, with the distance between therebetween being greater than the distance between the temperature sensor 160 and the first electronic component. That is, the distance between the power supply 10 and the temperature sensor 160 is preferably greater than the distance between the temperature sensor 160 and the first electronic component (the controller 50 or the pressure sensor 20). In the case where the temperature sensor 160 is built in the controller 50, the distance between the temperature sensor 160 and the controller 50 is zero.

The controller 50 is configured to determine or estimate the temperature of the second electronic component, namely, the power supply 10 on the basis of an output value obtained from the temperature sensor 160.

Specifically, the temperature sensor 160 outputs the value of the determined or estimated temperature of the power supply 10. That is, the temperature of the power supply 10 is determined or estimated by using the temperature sensor 160 disposed in or adjacent to the first electronic component. The temperature of the power supply 10 may be determined without the need for a dedicated temperature sensor disposed in or adjacent to the power supply 10, and this feature may thus be a workaround to the problems such as increases in weight, size, and cost of the flavor generation device 100. By using the temperature sensor 160, the controller 50 can determine or estimate both the temperature of the first electronic component and the temperature of the second electronic component, namely, the power supply 10.

The temperature sensor 160 is disposed in a place other than the place where airflow caused by the user's inhalation produces the maximum cooling effect. In this case, the temperature sensor 160 is less likely to be affected by the airflow and may thus reduce the possibility that the accuracy of the value of the determined or estimated temperature of the power supply 10 will suffer.

The temperature sensor 160 is preferably disposed beyond the inhalation opening 141 when viewed from the inlet 125. Outside air taken in through the inlet 125 flows toward the inhalation opening 141, and as a result, the fluid flow is generally strong in the section between the inlet 125 and the inhalation opening 141. The temperature sensor 160 may be disposed beyond the inlet 125 when viewed from the inhalation opening 141, and this layout is thus advantageous in that the temperature sensor 160 is less likely to be affected by the cooling effect of the airflow. The temperature sensor 160 can thus determine or estimate the temperature of the power supply 10 accurately.

The temperature sensor 160 is preferably disposed outside the flow path 122A, which is a path of gas flow, and is preferably disposed inside the flavor generation device 100, that is, inside the case 113. In this case as well, the temperature sensor 160 is less likely to be affected by the cooling effect of airflow. The temperature sensor 160 can thus determine or estimate the temperature of the power supply 10 more accurately. Furthermore, the temperature sensor 160 is separated from surroundings of the flavor generation device 100 by the case 113. The temperature sensor 160 is thus less likely to be affected by the ambient temperature.

In the present embodiment, the power supply 10 is disposed beyond the inlet 125 when viewed from the inhalation opening 141 (see FIG. 1). The temperature sensor 160 is preferably disposed beyond the power supply 10 when viewed from the inhalation opening 141. In this case, the power supply 10 is disposed between the flow path 122A, which extends from the inlet 125 to the inhalation opening 141, and the temperature sensor 160. The power supply 10 thus serves as a windbreak and reduces the possibility that airflow will come into contact with the temperature sensor 16. Consequently, the temperature sensor 160 is much less likely to be affected by the cooling effect of airflow.

The temperature sensor 160 is preferably disposed in a region where the pressure is released to the atmosphere at least during the user's inhalation. In the present embodiment, the cap 330 has an opening 114, through which the pressure is released to the atmosphere. Owing to the release of pressure to the atmosphere, the temperature sensor 160 is less likely to be affected by the air-cooling effect of airflow generated by negative pressure. The temperature sensor 160 can thus determine or estimate the temperature of the power supply 10 more accurately.

The temperature sensor 160 is preferably disposed in such a manner that a main surface of the electronic component incorporating the temperature sensor 160 lies obliquely to a first plane. The first plane is defined by a plane lying in the direction of a vector longer than any other vector of airflow caused by the user's inhalation or is defined by a plane lying in the direction of a vector longer than any other vector of two-dimensional airflow caused by the negative pressure produced by the user's inhalation. The main surface of the electronic component is defined by a face whose area is greater than any other face of the electronic component. In the case where the temperature sensor 160 is built in the controller 50, the main surface of the electronic component is a main surface of the controller 50. In the case where part of the controller 50 is cylindrical as illustrated in FIG. 4, the main surface of the controller 50 may be defined by a face that is a bottom face of a cylindrical column.

In the present embodiment, the flow path 122A extends in the predetermined direction A. The direction of a vector longer than any other vector of airflow caused by the user's inhalation or the direction of a vector longer than any other vector of two-dimensional airflow caused by the negative pressure produced by the user's inhalation substantially coincides with the predetermined direction A. In this case, the first plane mentioned above is defined by a plane lying in the predetermined direction A. The temperature sensor 160 is preferably disposed in such a manner that the main surface of the electronic component incorporating the temperature sensor 160 lies obliquely to the plane lying in the predetermined direction.

The temperature sensor 160 is more preferably disposed in such a manner that the angle which the main surface of the electronic component incorporating the temperature sensor 160 forms with a second plane orthogonal to the first plane is smaller than the angle which the main surface forms with the first plane. With the first plane being defined by the plane lying in the predetermined direction A, the second plane is defined by a direction orthogonal to the predetermined direction A.

The temperature sensor 160 is still more preferably disposed in such a manner that the main surface of the electronic component incorporating the temperature sensor 160 is orthogonal to the first plane. With the first plane being defined by the plane lying in the predetermined direction, the temperature sensor 160 is thus preferably disposed in such a manner that the main surface of the electronic component incorporating the temperature sensor 160 is orthogonal to the predetermined direction A. In the example illustrated in FIGS. 3 and 4, the temperature sensor 160 is disposed in such a manner that the main surface of the controller 50 incorporating the temperature sensor 160 is orthogonal to the predetermined direction A.

As described above, the proportion of airflow components flowing along the main surface of the electronic component incorporating the temperature sensor 160 decreases with increasing inclination of the main surface of the electronic component incorporating the temperature sensor 160 with respect to the direction of a vector longer than any other vector of airflow caused by the user's inhalation or the direction of a vector longer than any other vector of two-dimensional airflow caused by the negative pressure produced by the user's inhalation. Consequently, the airflow will exert less cooling effect on the temperature sensor 160. The temperature sensor 160 can thus determine the temperature of the power supply 10 more accurately.

Referring to FIGS. 3 and 4, the following describes specific examples of more preferred configurations of the controller 50 and the temperature sensor 160. In the example illustrated in FIGS. 3 and 4, the temperature sensor 160 is built in the controller 50.

The power supply unit 110 may include: a first member 300, in which the temperature sensor 160 and the controller 50 are at least partially wrapped; and a second member disposed between the power supply 10, and the temperature sensor 160 and the controller 50, or adjacent thereto. In the present embodiment, the second member includes the pressure sensor 20 and/or a base 310. The second member (20 and/or 310) preferably faces the power supply 10.

The first member 300 may be, for example, a tubular member. When the temperature sensor 160 is at least partially wrapped in the first member 300, the temperature sensor 160 is less likely to be affected by airflow and the ambient temperature and can thus determine the temperature of the power supply 10 more accurately. The temperature sensor 160 is more preferably enclosed with the first member 300 and the second member (20 and/or 310).

In the example illustrated in FIGS. 3 and 4, the pressure sensor 20 is enclosed in the base 310, which is closer than the controller 50 to the power supply 10. The base 310 is disposed between the power supply 10, and the temperature sensor 160 and the controller 50.

The flavor generation device 100 may include a heat transfer suppression unit that suppresses the transfer of heat between the case 113, and the temperature sensor 160 and the controller 50. The heat transfer suppression unit may be, for example, the first member 300. In this case, the heat transfer suppression unit, namely, the first member 300 preferably forms a space in which the temperature sensor 160 and the controller 50 are housed. The heat transfer suppression unit may be a tube made of stainless steel (steel special use stainless: SUS) or may be a member whose thermal conductivity is lower than the thermal conductivity of stainless steel (SUS). For example, the heat transfer suppression unit may have a thermal conductivity of 24 (W/m·° C.) or lower. The heat transfer suppression unit is disposed between the case 113, and the temperature sensor 160 and the controller 50 to suppress heat transfer to the case 113, and the overheating of the case 113 may be minimized accordingly. Furthermore, heat transfer from the ambient air to the temperature sensor 160 through the case 113 may also be suppressed, and the temperature sensor 160 can thus determine or estimate the temperature of the power supply 10 more accurately.

In the present embodiment, the first member 300 is fitted with the cap 300 and the base 310, which in turn form a housing space in which the controller 50 and the temperature sensor 160 are housed. The pressure in the housing space may be released to the atmosphere through the opening 114 mentioned above.

The first member 300 and/or the case 113 may have an uneven or rough surface, where the proportion of the area of regions in which the heat transfer suppression unit, namely, the first member 300 is in contact with the case 113 may thus be low. In this case as well, heat transfer to the case 113 may be suppressed, and heat transfer from the ambient air to the temperature sensor 160 through the case 113 may also be suppressed. Furthermore, the space (air space) defined between the first member 300 and the case 113 also serves as the heat transfer suppression unit. That is, air between the first member 300 and the case 113 offers thermal insulation. Consequently, heat transfer to the case 113 may be suppressed to a greater extent, and heat transfer from the ambient air to the temperature sensor 160 through the case 113 may also be suppressed to a greater extent.

The flavor generation device 100 may include a thermally conductive member disposed between the power supply 10 (the second electronic component), and the temperature sensor 160 and the controller 50, or adjacent thereto. The thermally conductive member enhances conduction of heat between the power supply 10, and the temperature sensor 160 and the controller 50. The temperature sensor 160 can thus determine the temperature of the power supply 10 more accurately.

The thermally conductive member may include the pressure sensor 20 and/or the base 310. In this case, heat generated by the power supply 10 can be conducted to the temperature sensor 160 through the pressure sensor 20 and/or the base 310. The thermal conductivity of the second member, namely, the pressure sensor 20 and/or the base 310 in this case is preferably higher than the thermal conductivity of the first member 300. The base 310 in this case may be a metal member made of, for example, crystalline silicon. This will enhance conduction of heat from the power supply 10 through the first member 300 toward the temperature sensor 160. The temperature sensor 160 can thus determine the temperature of the power supply 10 more accurately.

In an alternative example, the thermally conductive member may be the first member 300. The first member 300 provided as the thermally conductive member may be a tube made of stainless steel (SUS) or may be a member whose thermal conductivity is higher than the thermal conductivity of stainless steel (SUS). In this case, heat generated by the power supply 10 can be conducted to the temperature sensor 160 through the first member 300. It is acceptable that the base 310 has a relatively low thermal conductivity. The base 310 may be made of a resin material such as silicone resin. Including, as the base 310, silicone resin instead of crystalline silicon improves the ease of fastening the electronic components in the power supply unit 110.

In any case, conduction of heat generated at the power supply 10 to the temperature sensor 160 through the thermally conductive member may be enhanced, and the temperature sensor 160 can thus determine the temperature of the power supply 10 accurately.

It is preferred that the thermally conductive member disposed between the power supply 10 (the second electronic component), and the temperature sensor 160 and the controller 50 or adjacent thereto be less susceptible to heat generated by any heat source other than the power supply 10 such as heat generated by the load 121R. In a specific example, the thermally conductive member may be discretely located away from the load 121R. It is more preferred that the distance between the thermally conductive member and the power supply 10 be less than the distance between the thermally conductive member and the load 121R.

The power supply unit 110 may include a housing that is disposed in the flavor generation device 10 in a manner so as to accommodate the temperature sensor 160. The housing may accommodate not only the temperature sensor 160 but also at least part of the controller 50. The housing may be, for example, a tubular body or sealing resin. In the present embodiment, the temperature sensor 160 is sealed in sealing resin. Thus, the temperature sensor 160 is much less likely to be affected by airflow. The temperature sensor 160 can thus determine or estimate the temperature of the power supply 10 more accurately.

At least part of the outer shape of the controller 50 may be cylindrical. Similarly, at least part of the outer shape of the pressure sensor 20 may be cylindrical. In this case, the first member 300 is preferably cylindrical. Such a case where at least part of the outer shape of the controller 50 and/or at least part of the outer shape of the pressure sensor 20 is cylindrical is advantageous for the flavor generation device 10, the outer shape of which as a whole may be columnar, and more preferably, cylindrical. The flavor generation device 10 may be formed to resemble the shape of conventional cigarettes accordingly.

With the temperature sensor 160 being discretely located away from the power supply 10 as mentioned above, the controller 50 may estimate the temperature of the power supply 10 on the basis of a reading, namely, an output value obtained from the temperature sensor 160. In some cases, the temperature at the position of the temperature sensor 160 may be slightly different from the temperature of the power supply 10. On the precondition that tests have been conducted to measure the disparity between the actual temperature of the power supply 10 and the output value obtained from the temperature sensor 160, the controller 50 may be configured to estimate the temperature of the power supply 10 on the basis of the output value obtained from the temperature sensor 160.

Figure 8:
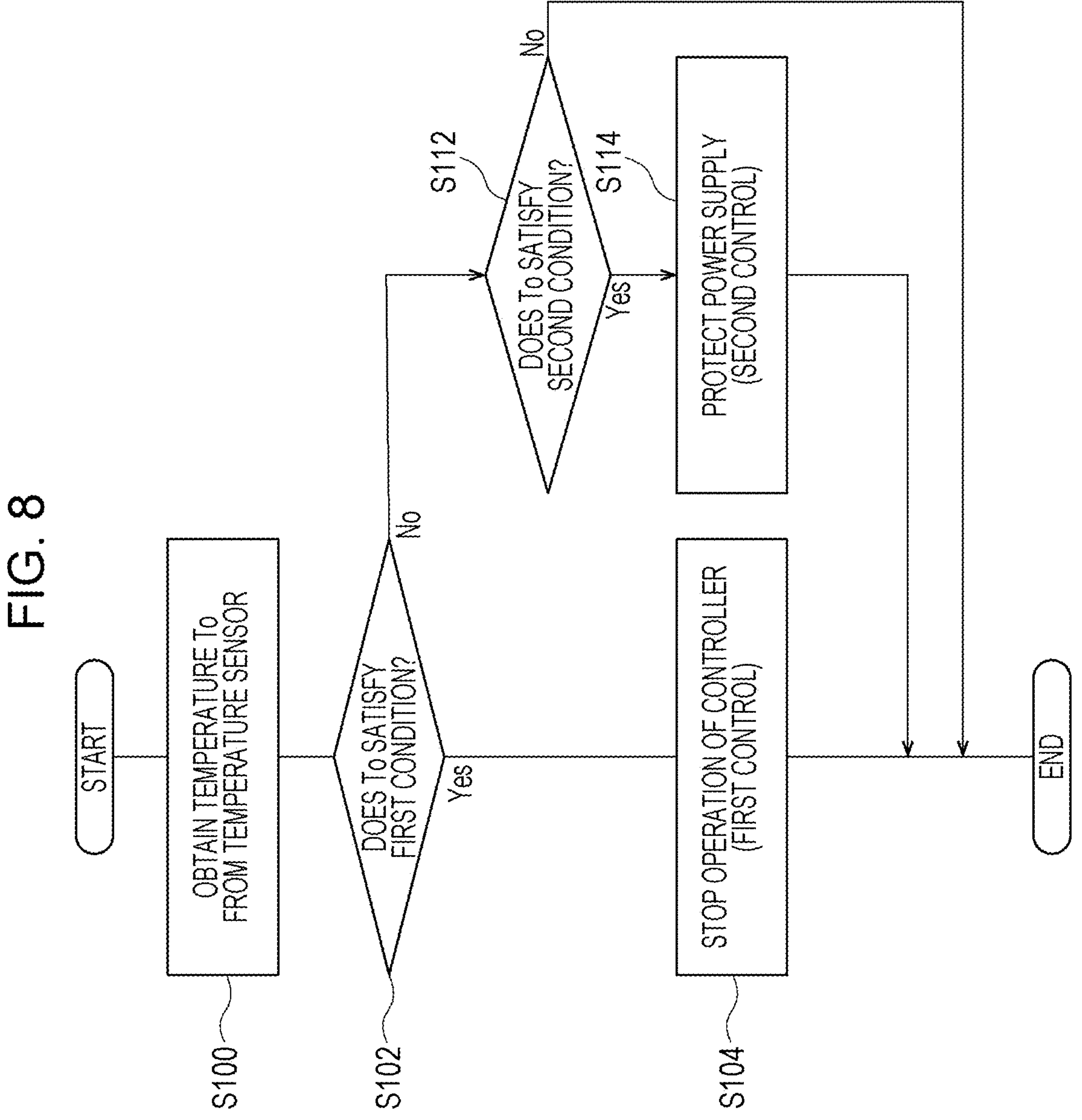
FIG. 8 is a flowchart of a control process by using the temperature determined from a temperature sensor.

FIG. 8 is a flowchart of a control process based on the temperature determined by using the temperature sensor 160. The process in the flowchart in FIG. 8 is preferably carried out by the controller 50 while the flavor generation device 100, or more specifically, the controller 50 is operating. The process in the flowchart in FIG. 8 is carried out by the controller 50 while the power supply 10 is charged and/or while the power supply 10 is discharged. It is particularly preferred that the controller 50 perform controls including protection of the power supply 10 as will be described below while the power supply 10 is charged and is thus under heavy load conditions. The expression "the power supply 10 is discharged" herein means that, for example, the power supply 10 supplies the load 121R with power.

First, the controller 50 obtains an output value (To) from the temperature sensor 160 (Step S100).

When the output value (To) obtained from the temperature sensor 160 satisfies a first condition, the controller 50 performs a first control on the first electronic component (Steps S102 and S104).

As for controls referred to in the flowchart, the first electronic component is the controller 50. The controls involve the first condition: the controller 50 is operating outside its recommended operating temperature range. For example, the controls involve the first condition: To>85° C. or To<−40° C. That is, when the output value (To) obtained from the temperature sensor 160 satisfies the first condition, the controller 50 judges that the controller 50 is operating outside its recommended operating temperature. In this case, the controller 50 may perform the first control, or more specifically, may prohibit charging or discharging of the power supply 10 and may stop operating (Step S104). The controller 50 may, as necessary, cause the notification unit 40 to inform the user of the occurrence of abnormality.

When the output value (To) obtained from the temperature sensor 160 satisfies a second condition different from the first condition, the controller 50 performs a second control on the power supply 10 (Steps S112 and S114).

In the present embodiment, the second condition may be specified by a temperature range different from the recommended operating temperature range for the power supply 10. In this case, the second control in Step S114 may be a protection control that is to be performed to protect the power supply 10.

For example, when the output value obtained from the temperature sensor 160 is lower than or equal to a first predetermined temperature at which the electrolyte solution or the ionic liquid in the power supply 10 freezes or when the temperature of the power supply 10 is estimated, on the basis of the output value obtained from the temperature sensor 160, to be lower than or equal to the first predetermined temperature, the controller 50 may perform the second control, or more specifically, may perform the protection control to protect the power supply 10. The protection control may include: restricting or prohibiting charging and/or discharging of the power supply 10; and/or (preferably and) transmitting an alert signal.

The protection control is performed in the following manner: the controller 50 transmits an alert signal to the notification unit 40. That is, the controller 50 may use the notification unit 40 to alert the user of the occurrence of abnormality in the power supply.

Charging and/or discharging of the power supply 10 may be restricted or prohibited in the following manner: the controller 50 causes the switch 140 or 180 to turn OFF temporarily or to maintain OFF. Consequently, the power supply 10 may be protected by being in a temperature range in which the electrolyte solution or the ionic liquid in the power supply 10 freezes. The first predetermined temperature is, for example, 0° C. When the temperature of the power supply 10 falls below 0° C., moisture in the power supply 10, or more specifically, water in the electrolyte solution can freeze. As a result, deterioration of the power supply 10 is likely to be accelerated. It is thus preferred that the use of the power supply 10 in such a temperature range be restricted or prohibited.

A specific example of Steps S112 and S114 is as follows: the controller 50 may be configured to perform the protection control to protect the power supply 10 when the output value obtained from the temperature sensor 160 is lower than or equal to a second predetermined temperature at which electrodeposition occurs on an electrode of the power supply 10 or when the temperature of the power supply 10 is estimated, on the basis of the output value obtained from the temperature sensor 160, to be lower than or equal to the second predetermined temperature. The protection control is as described above.

The protection operation mentioned above is particularly preferred for a lithium-ion secondary battery included as the power supply 10, where metallic lithium can be deposited (electrodeposition can occur) on the surface of the negative electrode when the power supply 10 operates at a low temperature under heavy load conditions. It is required that tests be conducted in advance to determine the second predetermined temperature, which can vary depending on the type of lithium-ion secondary battery.

Another specific example of Steps S112 and S114 is as follows: the controller 50 may be configured to perform the protection control to protect the power supply 10 when the output value obtained from the temperature sensor 160 is higher than or equal to a third predetermined temperature at which a structural or compositional change occurs in an electrode of the power supply 10 or when the temperature of the power supply 10 is estimated, on the basis of the output value obtained from the temperature sensor 160, to be higher than or equal to the third predetermined temperature. The protection control is as described above. When the power supply 10 reaches an extremely high temperature, a structural or compositional change can occur in an electrode, and thus, the controller 50 preferably performs the protection control mentioned above. The third predetermined temperature may be, for example, 60° C.

In light of the protection of the power supply 10, and the protection of a lithium-ion secondary battery in particular, the controller 50 may be configured to perform the protection control to protect the power supply 10 when the output value obtained from the temperature sensor 160 is less than 0° C. or greater than or equal to 60° C. or when the temperature of the power supply 10 is estimated, on the basis of the output value obtained from the temperature sensor 160, to be lower than 0° C. or higher than or equal to 60° C. (Steps S112 and S114). The protection control is as described above.

As described in the flowchart in FIG. 8, the controller 50 is configured to perform a predetermined control (the protection control) on the power supply 10 (the second electronic component) without performing a control (the first control mentioned above) on the controller 50 (the first electronic component) when the output value obtained from the temperature sensor 160 satisfies a predetermined condition (the second condition). A specific example is as follows: the controller 50 performs the protection control on the power supply 10 when the output value obtained from the temperature sensor 160 is within a range in which the controller 50 is in no need of cooling and when the output value satisfies the predetermined condition. In this way, the controller 50 can use a single temperature sensor, namely, the temperature sensor 160 to perform both the control for protecting the controller 50 and the control for protecting the power supply 10.

It is preferred that the process in the flowchart in FIG. 8 be repeatedly carried out while, for example, the power supply 10 is charged or discharged. When the output value obtained from the temperature sensor 160 returns to a normal range after the protection control is performed on the power supply 10 (Step S114), the protection control on the power supply 10 may be removed. This means that the controller 50 in this case may enable charging or discharging of the power supply 10.

Figure 9:
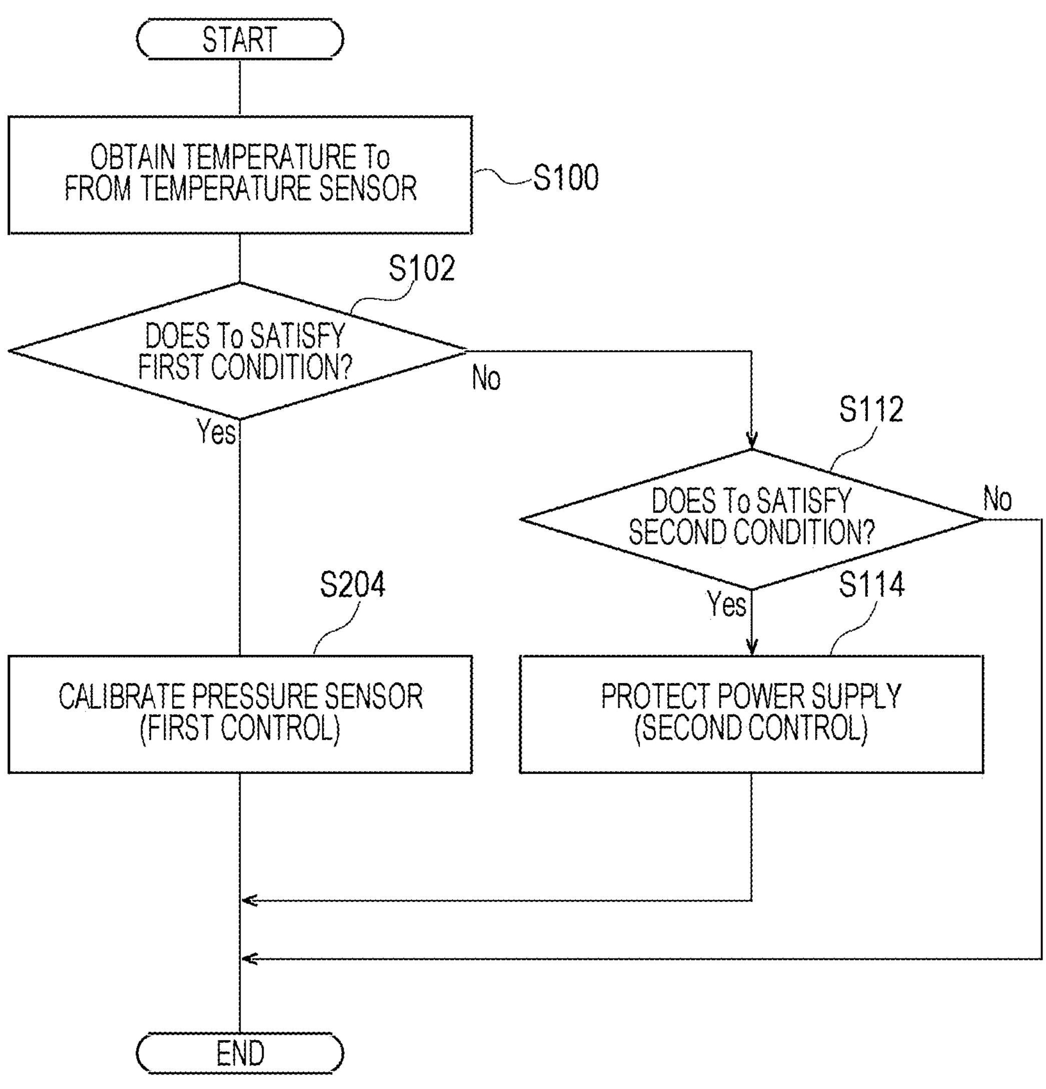
FIG. 9 is a flowchart of another control process by using the temperature determined from the temperature sensor.

FIG. 9 is a flowchart of another control process based on the temperature determined by using the temperature sensor 160. Referring to FIG. 9, the controller 50 obtains an output value (To) from the temperature sensor 160 (Step S100).

When the output value (To) obtained from the temperature sensor 160 satisfies a first condition, the controller 50 performs a first control on the first electronic component (Steps S102 and S204). As for controls referred to in the flowchart, the first electronic component is the pressure sensor 20. The controls involve the first condition: a change in the output value obtained from the pressure sensor 20. When the output value (To) obtained from the temperature sensor 160 satisfies the first condition, the controller 50 or the pressure sensor 20 calibrates, on the basis of the output value obtained from the temperature sensor 160, the pressure value obtained from the pressure sensor 20 (Step S204). There is a correlation between the temperature and the pressure of a gas as described by an equation of state. Performing calibration on the pressure sensor 20 in accordance with temperature variations may thus ensure the constant relationship between the inhalation force exerted by the user and the output value obtained from the pressure sensor 20 in a manner independent of any change in temperature.

When the output value (To) obtained from the temperature sensor 160 satisfies a second condition different from the first condition, the controller 50 performs a second control on the power supply 10 (Steps S112 and S114).

In the present embodiment, the second condition may be specified by a temperature range different from the recommended operating temperature range for the power supply 10. In this case, the second control in Step S114 may be a protection control that is to be performed to protect the power supply 10. When the output value obtained from the temperature sensor 160 is within a temperature range different from the recommended operation temperature range for the power supply 10, the pressure sensor 20 does not need calibration. The process of the protection control (Steps S112 and S114), which is to be performed to protect the power supply 10, is identical to the process in FIG. 8 and will not be further elaborated here.

Subsequent to the calibration of the pressure sensor 20, the controller 50 may detect the user's inhalation action by using the pressure sensor 20 having undergone calibration. Upon detection of the user's inhalation action, the controller 50 may switch the switch 140 to the ON state to supply the load 121R with power.

The process in FIG. 8 or 9 described above involves turning off the controller 50 or performing the protection control on the power supply 10 when the output value obtained from the temperature sensor 160 is too large or too small. Alternatively, the controller 50 may use a temperature regulation mechanism (not illustrated) to perform temperature control so that the temperature of an electronic component such as the power supply 10 falls within an appropriate range. When, for example, the output value obtained from the temperature sensor 160 is too large, the temperature adjustment mechanism may cool the controller 50 or the power supply 10. When the output value obtained from the temperature sensor 160 is too small, the temperature adjustment mechanism may heat the controller 50 or the power supply 10.

(Program and Storage Medium)

The process in FIG. 8 and the process in FIG. 9 may be carried out by the controller 50. Specifically, the controller 50 may include: a program that causes the power supply unit 110 to execute the method mentioned above; and a storage medium in which the program is stored.

Other Embodiments

Although the present invention has been described as the embodiment above, the description and the drawings, which are part of the present disclosure, should not be construed as limiting the present invention. The present disclosure will offer various alternative embodiments, examples, and operational techniques to those skilled in the art.

For example, the flavor generation device 100 according to the embodiment above includes: an aerosol source from which aerosol is generated; and a flavor source including a tobacco raw material or an extract from such a tobacco raw material that gives a flavoring. Alternatively, the flavor generation device 100 may include the aerosol source or the flavor source.

It should be noted that the term "flavor" herein may refer to a broad idea that may be interpreted as a flavoring generated from the flavor source or the aerosol source or may be interpreted as a flavoring derived from the flavor source or the aerosol source.

The electrical load 121R in the embodiment above is configured to act on the aerosol source in a manner so as to gasify or atomize the aerosol source. Alternatively, the electrical load 121R may be configured to heat the flavor source or the flavor unit, which in turn releases a flavor. The electrical load 121R may be configured to heat both the aerosol source and the flavor source.

The invention claimed is:

1. A flavor generation device comprising:

a case;

a first electronic component disposed in the case;

a temperature sensor disposed in the first electronic component;

a second electronic component disposed in the case; and a controller configured to determine or estimate a temperature of the second electronic component, based on an output value obtained from the temperature sensor, and perform a predetermined control on the second electronic component when the output value obtained from the temperature sensor satisfies a predetermined condition.

2. The flavor generation device according to claim 1, wherein the first electronic component comprises the controller.

3. The flavor generation device according to claim 1, wherein the first electronic component comprises the controller, and wherein the controller is configured to perform the predetermined control on the second electronic component without performing a further control on the first electronic component when the output value obtained from the temperature sensor satisfies the predetermined condition.

4. The flavor generation device according to claim 1, wherein the second electronic component is a power supply.

5. The flavor generation device according to claim 4, wherein the power supply comprises at least an electrolyte solution or an ionic liquid, and the controller is configured to perform a protection control to protect the power supply when the output value obtained from the temperature sensor is lower than or equal to a first predetermined temperature at which the electrolyte solution or the ionic liquid freezes or when a temperature of the power supply is estimated, based on the output value obtained from the temperature sensor, to be lower than or equal to the first predetermined temperature.

6. The flavor generation device according to claim 4, wherein the power supply is a lithium-ion secondary battery, and the controller is configured to perform a protection control to protect the power supply when the output value obtained from the temperature sensor is lower than or equal to a second predetermined temperature at which electrodeposition occurs on an electrode of the power supply or when a temperature of the power supply is estimated, based on the output value obtained from the temperature sensor, to be lower than or equal to the second predetermined temperature.

7. The flavor generation device according to claim 4, wherein the controller is configured to perform a protection control to protect the power supply when the output value obtained from the temperature sensor is higher than or equal to a third predetermined temperature at which a structural or compositional change occurs in an electrode of the power supply or when a temperature of the power supply is estimated, based on the output value obtained from the temperature sensor, to be higher than or equal to the third predetermined temperature.

8. The flavor generation device according to claim 4, wherein the controller is configured to perform a protection control to protect the power supply when the output value obtained from the temperature sensor is less than 0° C. or greater than or equal to 60° C. or when a temperature of the power supply is estimated, based on the output value obtained from the temperature sensor, to be lower than 0° C. or higher than or equal to 60° C.

9. The flavor generation device according to claim 1, further comprising a load that heats or atomizes an aerosol source or a flavor source by using power supplied by the power supply, wherein the controller is configured to control supply of power to the load.

10. The flavor generation device according to claim 1, wherein at least part of an outer shape of the first electronic component is cylindrical.

11. The flavor generation device according to claim 1, further comprising a heat transfer suppression unit in which the first electronic component and the temperature sensor are at least partially wrapped, the heat transfer suppression unit being configured to suppress transfer of heat between the first electronic component and the case.

12. The flavor generation device according to claim 11, wherein the heat transfer suppression unit forms a space in which the first electronic component and the temperature sensor are housed.

13. The flavor generation device according to claim 1, further comprising a thermally conductive member disposed between the first and second electronic components.

14. The flavor generation device according to claim 1, further comprising:

a first member in which the first electronic component and the temperature sensor are at least partially wrapped; and a second member disposed between the first and second electronic components, wherein a thermal conductivity of the second member is higher than a thermal conductivity of the first member.

15. The flavor generation device according to claim 14, wherein the first electronic component and the temperature sensor are enclosed with the first and second members, and the second member faces the second electronic component.

* * * * *